A. A. ZALONDEK.
COTTON CLEANER.
APPLICATION FILED SEPT. 7, 1909.
988,532.
Patented Apr. 4, 1911.
6 SHEETS—SHEET 1.
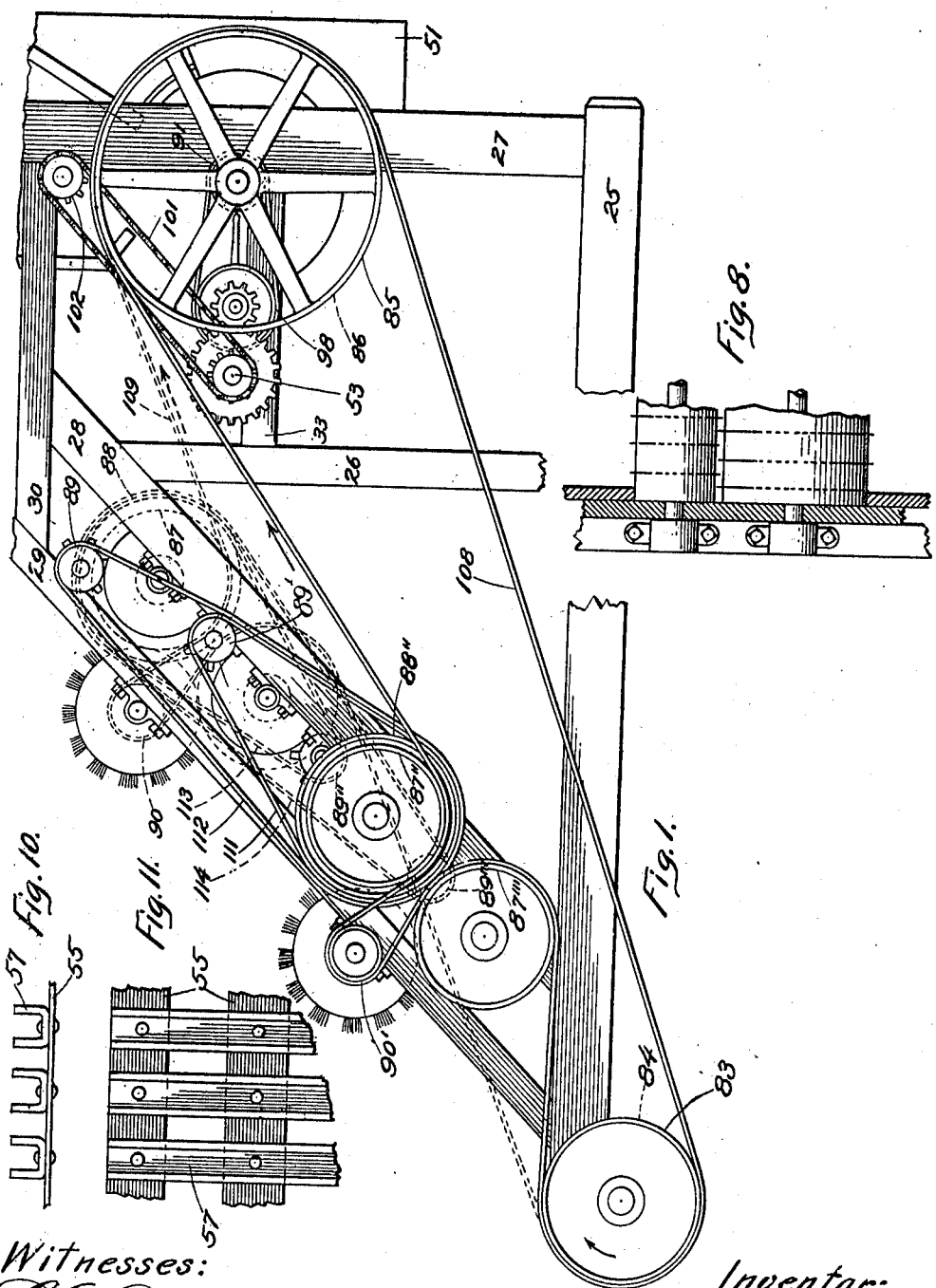

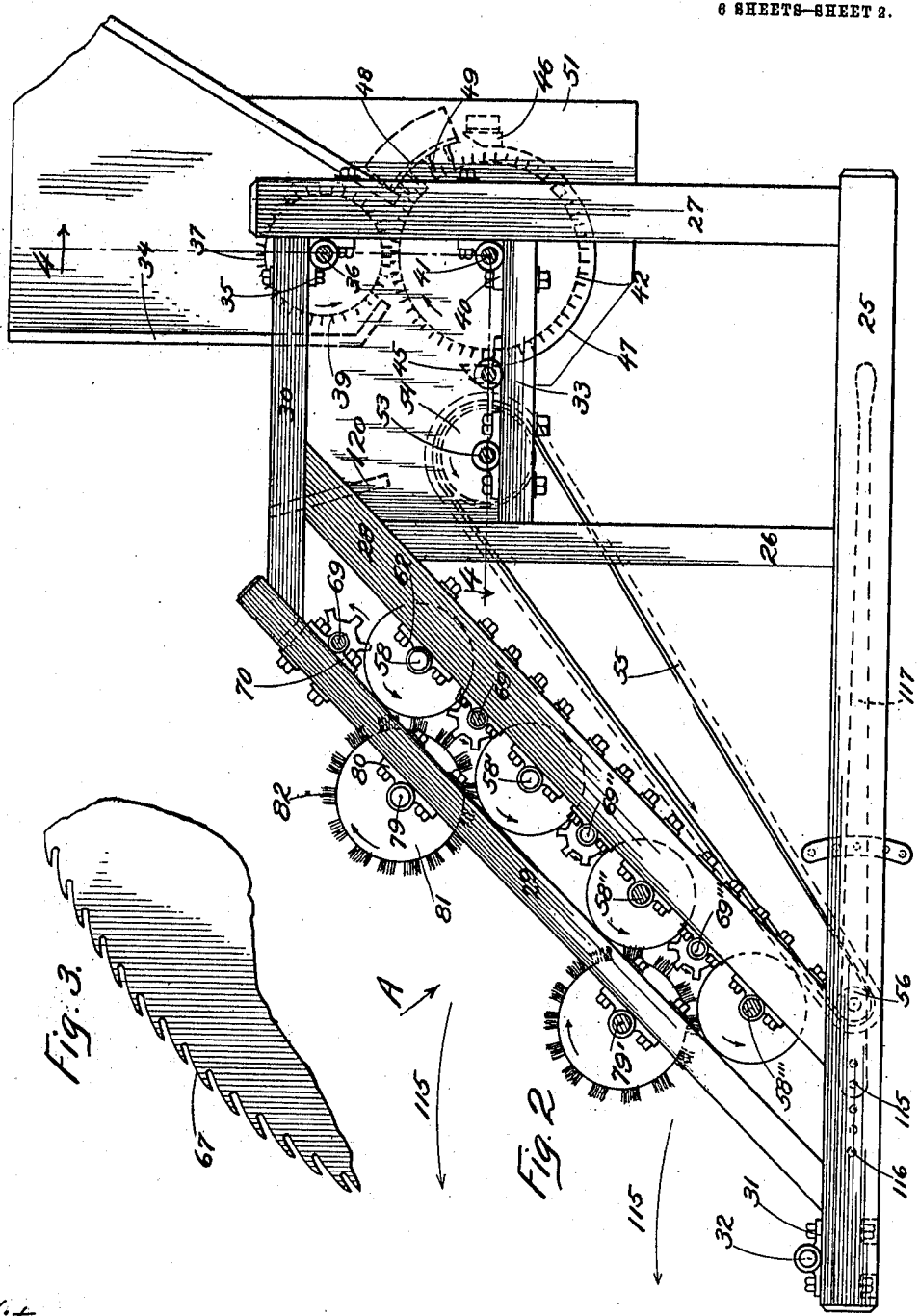

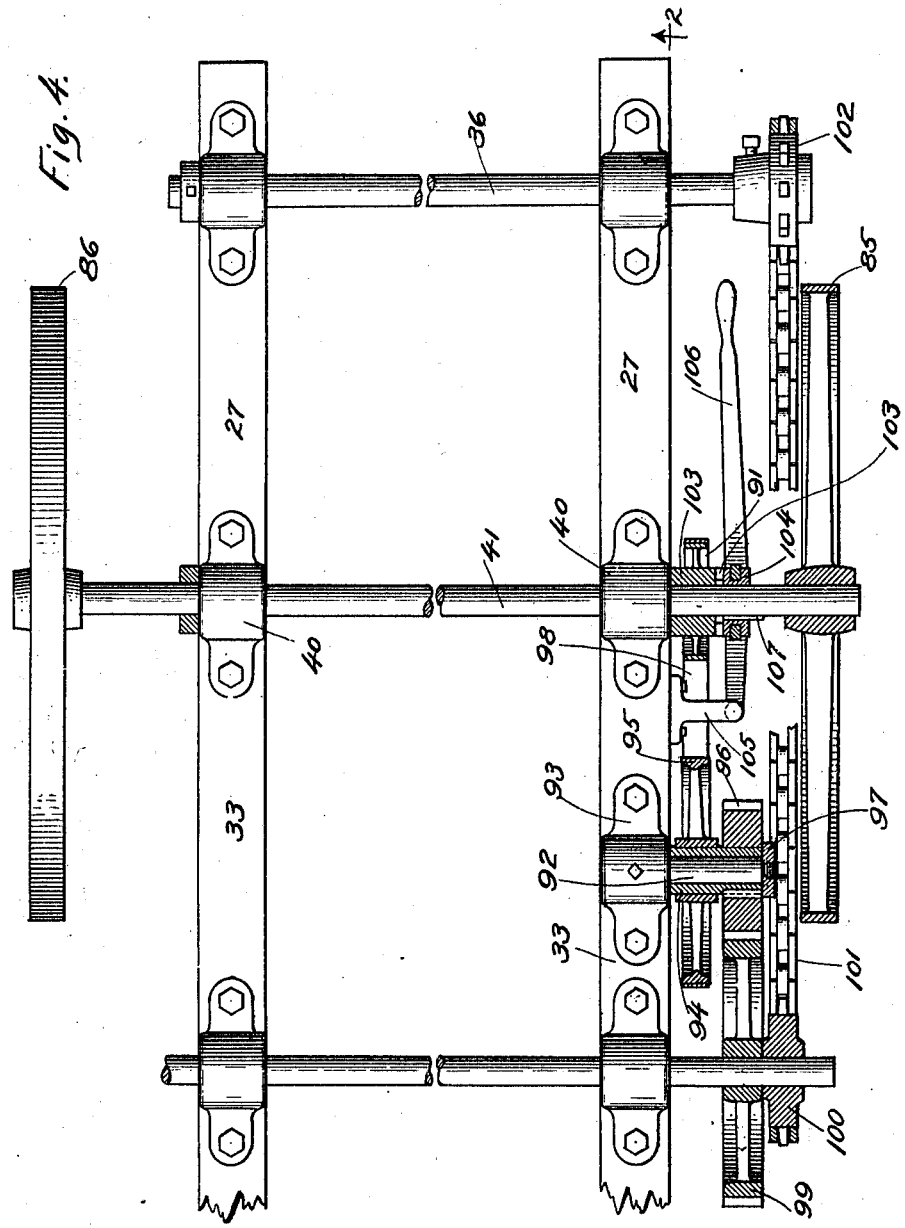

A. A. ZALONDEK.
COTTON CLEANER.
APPLICATION FILED SEPT. 7, 1909.
988,532.
Patented Apr. 4, 1911.
6 SHEETS—SHEET 4.
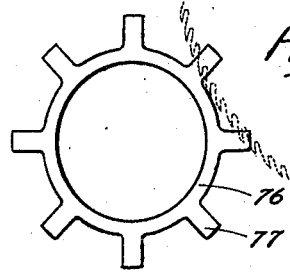
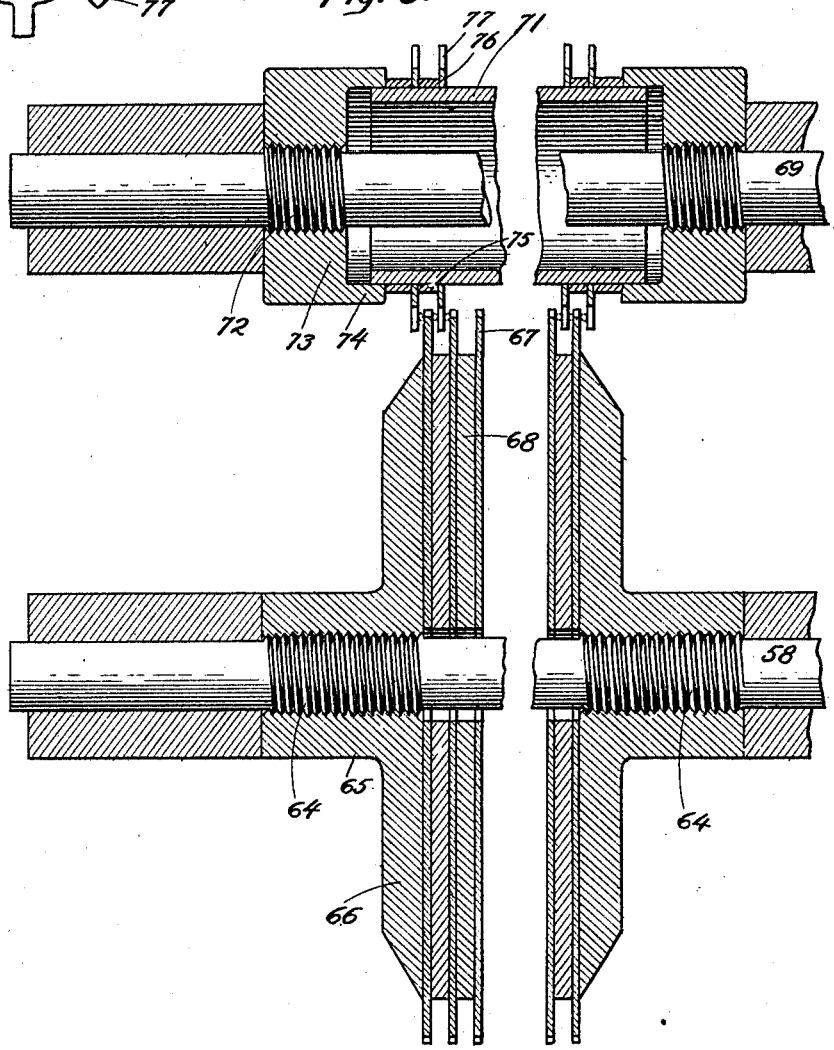

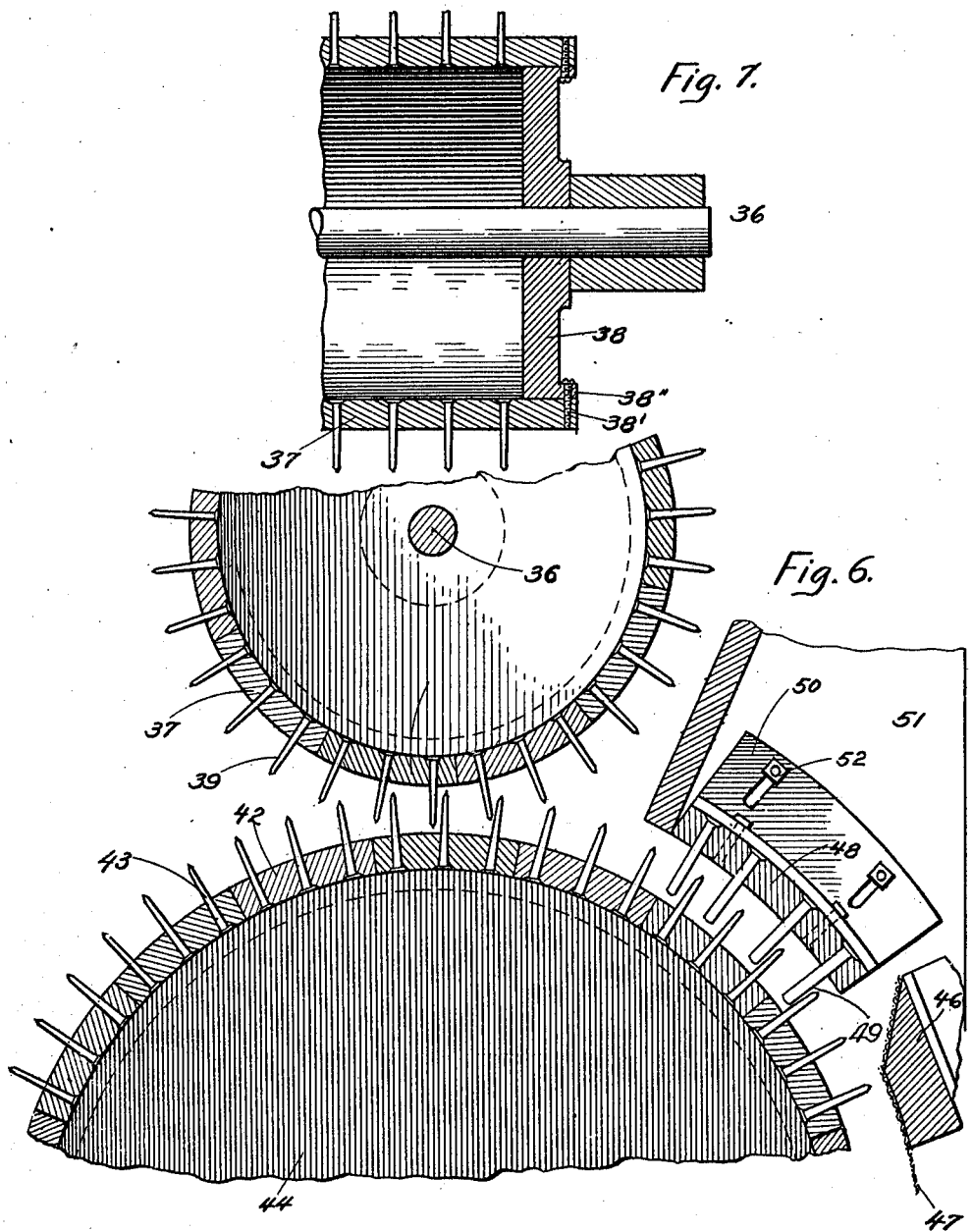

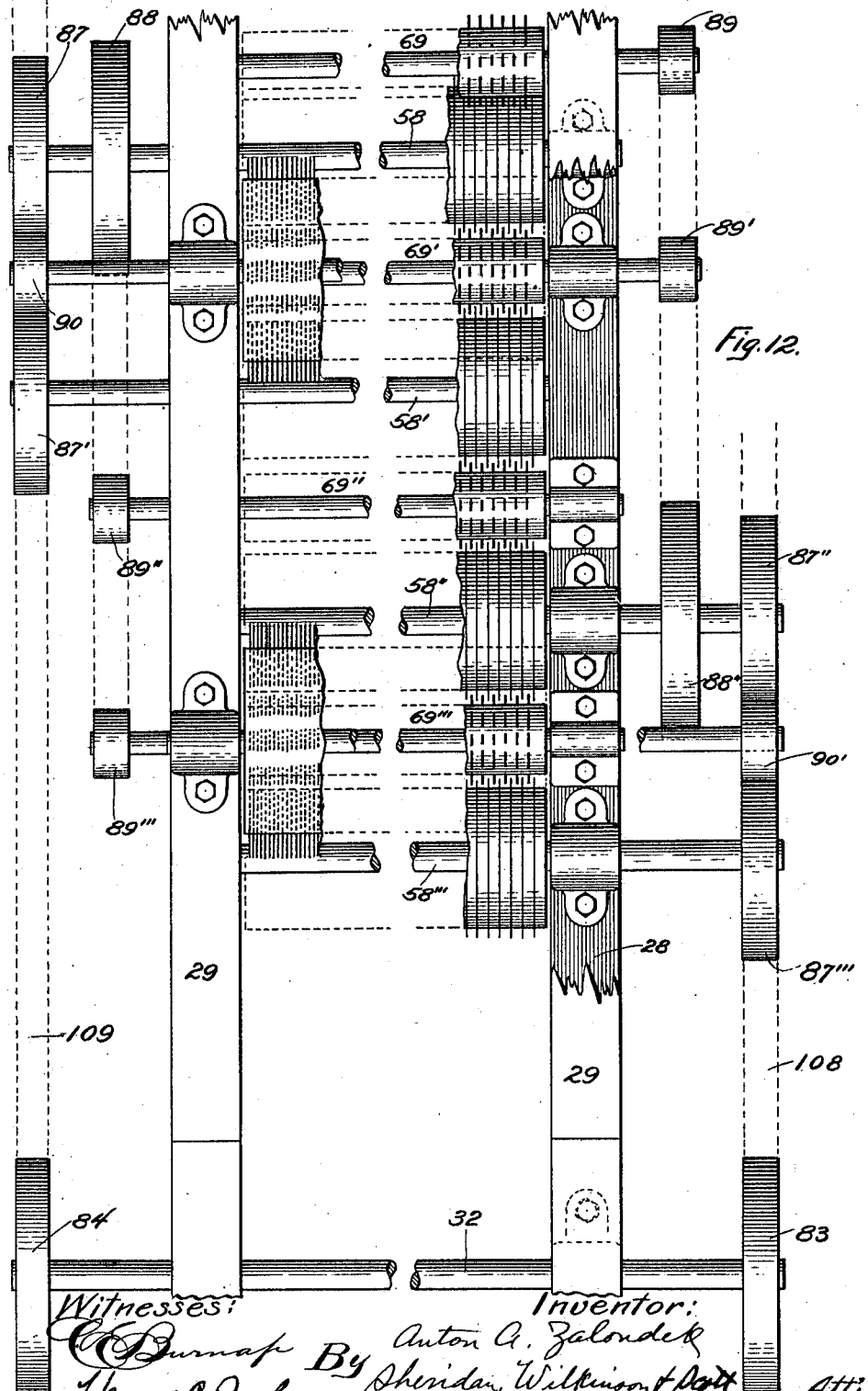

UNITED STATES PATENT OFFICE.

ANTON A. ZALONDEK, OF OKLAHOMA, OKLAHOMA, ASSIGNOR OF ONE-HALF TO WILLIAM W. BIERCE, OF OKLAHOMA, OKLAHOMA.

COTTON-CLEANER.

988,532.  Specification of Letters Patent.  Patented Apr. 4, 1911.

Application filed September 7, 1909. Serial No. 516,385.

*To all whom it may concern:*

Be it known that I, ANTON A. ZALONDEK, a citizen of the United States, residing at Oklahoma city, in the county of Oklahoma and State of Oklahoma, have invented certain new and useful Improvements in Cotton-Cleaners, of which the following is a specification.

The principal object of my invention is to provide a new and improved machine for cleaning cotton and separating it from the hulls.

A further object is to provide such a machine with a series of gangs of saws in combination with a conveyer that shall feed the cotton to the saws progressively in a suitable manner.

Another object is to combine with the gangs of saws a preliminary breaking roll that shall prepare the cotton for further treatment.

Still another object is to construct a cotton cleaner with beater rolls to coöperate with the gangs of saws, each beater roll being built up in a new and improved manner.

Still another object is to make a cotton cleaner that shall so engage the cotton and have the cotton fed to it in such a manner that the cotton will not be rolled into wads but will be lifted properly from the mass and detached therefrom.

With the foregoing objects in view and other objects which will be more readily apparent in the following specification and claims, my invention will be seen to consist of the combination of elements defined in the appended claims.

For the purpose of illustration and explanation, I have in this specification and in the attached drawings, shown one specific embodiment of my invention, but it will be understood that the invention is not limited to the disclosure in this specification, but is as broad as the appended claims.

As is well known, cotton ripens in successive crops that require picking at different times. It is frequently the case that the last crop is frosted, because of the lateness of the season, and this may prevent the bolls from opening. My cleaner is adapted to prepare and clean the cotton for ginning in cases where the bolls have not opened or are only partially opened. The bolls when fed to the machine are likely to be mixed with sand, dirt, leaves and sticks, and the machine which embodies my invention is adapted to clean the cotton, break and separate the husks, and deliver the seed cotton in ready shape for the ginner.

In the accompanying drawings, Figure 1 is a side elevation of my improved cotton cleaner. Fig. 2 is a vertical section of the same taken on the line 2 in Fig. 4, that is just within the belts and belt wheels shown in Fig. 1. Fig. 3 is a detail view illustrating one of the saws. Fig. 4 is a section on the line 4—4 in Fig. 2, the line on which this section is taken being a broken line with the parts at a right angle. Fig. 5 is a detail axial section of one of the gangs of saws and a co-acting beater roll. Fig. 6 is a cross section through the main feed roll and the co-acting breaking roll. Fig. 7 is an axial section of the feed roll. Fig. 8 is a detail sectional elevation of the feed roll and breaking roll. Fig. 9 is an elevation showing a detail element of the beater rolls. Figs. 10 and 11 illustrate the conveyer. Fig. 12 is an inclined plan view looking in the direction of the arrow A in Fig. 2.

The cotton cleaner stands on a horizontal base frame 25 on which are mounted the upright posts 26 and 27. Across the top of these posts is another horizontal frame 30 and the entire frame of the machine also comprises the inclined beams 28 and 29. The main driving shaft 32 is mounted in the journal boxes 31 on the base frame 25 at the end of the machine. At the opposite end of the machine at the upper part is the hopper 34 which receives the cotton to be cleaned. In the bottom of this hopper is the feed roll 37 carried by the shaft 36 mounted in the journal brackets 35. This feed roll is shown in detail in Fig. 7 from which it appears that the shaft 36 carries two spiders 38, to the peripheries of which the planks 37 are attached by means of the screws 38′ through the spider flanges 38″.

Directly below the feed roll 37 is the breaking roll 42 carried by the shaft 41 mounted in the journal brackets 40, these journal brackets being bolted to the posts 27 and the horizontal frame members 33. The breaking roll is constructed in the same manner as the feed roll already described, that is the shaft 41 carries spiders 44 to which the planks 42 are attached. Both the feed roll 37 and the breaking roll 42 have spikes respectively designated as 39 and 43 which are arranged in staggered circumferential rows so that they intermesh as shown in Fig. 8. On each side of the breaking roll 42 are the horizontal frame members 45 and 46 with a semi-cylindrical wire screen extending between them below the breaking roll. This screen is designated on the drawings by the reference numeral 47 and is preferably made of No. 14 wire with a mesh of square shape each side being 5/8 of an inch. Between the lower edge of the hopper 34 and the frame member 46 is an adjustable segment 48 with inwardly projecting teeth 49. At its ends the segment 48 carries short angle irons 50, which are bolted by means of the bolts 52 to the blocks 51. It will be observed that these bolts 52 engage slots in the flanges of the angle irons 50 and thus permit adjustment of the segment 48 in a radial direction with respect to the breaking roll 42. The adjustable toothed segment 48 is intended to be used only for wet cotton. With wet cotton it is intended to be adjusted so that the teeth 49 will intermesh with the teeth 43 on the breaking roll 42, but for dry cotton the segment 48 should preferably be drawn back so that the teeth 49 will not catch the cotton.

Journaled on the horizontal frame members 33 is the shaft 53 which carries the conveyer belt driving pulley 54. The conveyer 55 passes around the driving pulley 54 and the driven pulley 56. The conveyer is shown in detail in Figs. 10 and 11 wherein it appears that it comprises a series of parallel bands 55 to which are riveted transverse channels 57. The rivets pass through the webs of the channels and the flanges project outwardly from the conveyer. The adjustable gate 120 serves to prevent the cotton from feeding too fast to the conveyer 55.

Mounted on the inclined frame member 28 above the conveyer 55 is a series of transverse shafts 58, 58', 58'' and 58'''. Each of these shafts carries a gang of saws. Since these four gangs of saws are alike, only one of them will be described in detail, that carried by the shaft 58. The shaft 58 is mounted to rotate in the journal bearings 62 which are bolted to the inclined beams 28. On each end the shaft 58 is slightly enlarged and screw threaded as indicated by 64. A collar 65 with internal screw threads engages the screw threads 64 and this collar 65 carries a circular flange 66. The respective saws 67 alternate with annular spacing disks 68 which space the saws apart. Both ends of the shaft 58 are equipped with similar disks 66 and by means of the screw threaded engagement with the shaft 58, the disk 66 can be clamped tight against the series of alternating saws 67 and spacer blocks 68. Adjacent to each gang of saws is a beater roll, the respective beater rolls being mounted on shafts 69, 69', 69'', 69'''. Since these beater rolls are alike, only one of them will be described in detail, namely the one mounted on the shaft 69. This shaft is carried in journal brackets 70. On one end the shaft 69 is slightly enlarged and screw threaded as indicated at 72. Engaging the screw threads is an internally screw threaded collar 73 having a cylindrically extended flange 74 which surrounds the end of the cylindrical shell 71. Around this shell 71 are alternating rings 76 with radial teeth 77 and plain spacer rings 75. The screw threaded collar 73 serves to clamp the toothed rings 75 tightly together on the cylindrical shell 71.

Two rotary cylindrical brushes are provided on the respective shafts 79 and 79'. The brush on the shaft 79 coöperates with two gangs of saws, namely, those on the shafts 58 and 58', and the brush on the shaft 79' co-acts with the other two gangs of saws, namely, those on the shafts 58'' and 58'''. Since the brushes on the two shafts 79 and 79' are alike, only one of them will be described in detail. The shaft 79 is mounted in journal bearings 80 bolted to the inclined beam 29. On the shaft 79 is a cylinder or drum 81 carrying longitudinal rows of bristles forming the brushes 82.

It is noted that the beater rolls on shafts 69, 69', 69'' and 69''' alternate in position with the four gangs of saws. Attention being directed to the arrows which show the directions of rotation of the various elements, it will be seen that each brush 82, for example, operates to take cotton off from the gang of saws 67 above and deliver it to the gang of saws 67' below. The brush 82 cleans the cotton off from the gang of saws 67 (on the shaft 58) and drives that cotton down upon the beater roll on the shaft 69' which carries it over, till it is picked off by the gang of saws on shaft 58'. The same brush 82 then operates to clean the cotton off from the gang of saws on the shaft 58'. The cotton on the gang of saws 67 (on the shaft 58) is fully cleaned by the beater roll on shaft 69, but by the described construction one brush is made to coöperate with two gangs of saws.

The direction of rotation of all the rotating elements has been indicated on the drawings by means of arrows. At the ends of the main driving shaft 32 are two driving pulleys 83 and 84 from which extend the respective belts 108 and 109. The breaking roll shaft 41 carries large band wheels 85 and 86 at its ends which are engaged and driven by the respective belts 108 and 109. Each shaft 58, 58', 58'' and 58''' has on one end thereof a band wheel 87, 87', 87'', 87'''. Two of these shafts, namely, 58 and 58'', also carry an additional band wheel 88 and 88'', respectively. Each beater roll shaft 69, 69', 69'' and 69''' carries a respective pulley 89, 89', 89'' and 89'''. Each brush shaft 79 and 79' carries a respective pulley 90 and 90'. The breaking roll shaft 41 carries a belt pulley 91 from which a belt 98 leads to the band wheel 95. This band wheel 95 is mounted together with a gear pinion 96 on the sleeve 94 which rotates on the stub shaft 92 supported by the bracket 93. The nut 97 on the end of the stub shaft 92 retains the sleeve 94. The gear wheel 99 on the shaft 53 meshes with the gear pinion 96. The shaft 53 also carries a sprocket wheel 100 from which a chain 101 leads to the sprocket wheel 102 on the end of the feed roll shaft 36. The belt pulley 91 is loosely mounted on the shaft 41 and has clutch teeth 103 on one end. The opposed coacting clutch member 104 is loosely mounted on the shaft 41 by means of the spline 107. A lever 106 pivoted at 105 engages the clutch member 104 so that the mechanism driven by the band wheel 85 can be thrown in or out of gear as desired. Disengaging the clutch does not stop the breaker roll 42 but stops the feed roll 37 and the conveyer 55 thus stopping the feeding of cotton through the cleaner.

The two belts 108 and 109 already referred to on opposite sides of the machine follow the courses shown in Fig. 1 of the drawings, passing around various pulleys and wheels to cause them to rotate. All the gangs of saws and the brushes are driven by these two belts 108 and 109. Around the belt wheel 88'' are two belts, one inner 111, and one outer 112, which respectively engage the two beater roll pulleys 89' and 89. On the belt wheel 88 are two belts, an inner 113, and an outer 114, which respectively engage the two beater roll pulleys 89'' and 89'''.

It is obvious from the drawings that when the driving shaft 32 rotates in the direction indicated by the arrow, then all the various rotatable elements of the machine will be driven to rotate in the directions indicated by the respective arrows on the drawings.

The dirty and bolly cotton being placed in the hopper 34 is caught by the teeth 39 of the feed roll 37 and fed comparatively slowly downward. The peripheral speed of the breaking roll 42 is much greater than that of the feed roll 37 and its teeth 43 therefore engage the cotton and carry it down within the screen 47. Sand, short sticks, leaf trash and other foreign particles are detached and fall down through the screen 47. If the cotton is wet the toothed segment 48 is pushed down in a position to engage it and loosen and tear the bolls apart. The cotton is delivered from the breaking roll 42 just above the cross beam 45 and is then caught and carried forward by the conveyer 55. As shown in the drawings the conveyer approaches closer and closer in its onward movement to the successive gangs of saws. The teeth of each gang of saws detach portions of the cotton from the mass on the conveyer and carry it up to the adjacent beater roll the teeth of which pass between the saw teeth and knock off the hulls that may be carried up with the cotton. The teeth of the saws 67 are small being preferably about $\frac{1}{4}$ inch apart from point to point. These teeth catch the protruding fibers of the uppermost mass of cotton bolls on the conveyer 55, and jerk the bolls out of the mass of broken husks and other debris with which they are mingled. Then these cotton bolls are struck and whipped by the projecting spikes 77 on the beater rolls, thus detaching all remnants of the husks. Thereafter the brushes 82 and 82' detach the cotton from the saws and it is delivered from the machine cleaned and in suitable condition to go to the ginner. The saws catch the cotton on the conveyer and lift it out of the associated foreign matter without rolling the cotton over or packing it into a mass, or mixing it with the debris to be cleaned out. The saws and beater teeth are so spaced as to permit the cotton seeds to slip between them. The action of the brushes 82 in detaching the cotton from one gang of saws and throwing it over to the other gang of saws, has already been described. The cotton is delivered from the machine in two streams as indicated by the arrows 115. The points of the teeth 69 of the saws are directed forward and so spaced that it is practically impossible for one of the cotton seeds to get caught on or under the point of a tooth. On the other hand the cotton does not become detached from the saws by centrifugal force.

It will be observed that the clutch lever 106 controls the operation of the feed roll 37 and the conveyer 55 but that it does not control the operation of the gangs of saws or the beater rolls and brushes that coact therewith. The levers 117 at the sides of the machine serve for adjusting the conveyer 55. They are pivoted at 115 and carry the ends of the driven roller 56. The pivotal points 115 can be adjusted to any one of the holes 116 as may be desired to properly tighten the conveyer 55.

It will be seen that raising the lever 117 about its fulcrum 115 will tend to bring the lower end of the conveyer 55 closer to the saws. If this has a tendency to slacken the belt too much, such tendency can be corrected by changing the position of the fulcrum 115 for which purpose the alternative holes 116 are provided in the beam 25. It will be seen that by means of adjusting the fulcrum 115 to the proper hole 116 and by rotating the lever 117, the conveyer can be adjusted both with respect to its tightness and its convergence to the gangs of saws.

Any number of gangs of saws can be provided, according to the desired capacity of the machine.

What I claim as new is—

1. In a cotton cleaner, a series of gangs of saws, and a sharply inclined conveyer for the cotton adjacent to said saws, the conveyer approaching closer to the successive gangs of saws toward its delivery end.

2. In a cotton cleaner, a series of gangs of saws mounted on parallel shafts in the same sharply inclined plane, and a belt conveyer for the cotton adjacent to said saws, the conveyer being mounted and moved in a plane under the plane of the saw shafts and converging downwardly toward the delivery end thereof.

3. In a cotton cleaner, an inclined frame, an inclined conveyer adapted to move downwardly in said frame, a series of gangs of saws mounted on shafts extending across said conveyer above the same, each succeeding gang of saws being a little nearer the conveyer than the gang above.

4. In a cotton cleaner, a supporting framework inclined so as to make a large angle with the horizontal, a series of gangs of saws in said framework on horizontal shafts ranged successively above one another, and an inclined conveyer under the saws converging toward them at the bottom.

5. In a cotton cleaner, a supporting framework inclined so as to make a large angle with the horizontal, a series of gangs of saws in said framework on horizontal shafts ranged successively above one another, and an inclined conveyer under the saws converging toward them at the bottom, said saws rotating upwardly on their sides adjacent to the conveyer and the conveyer moving downwardly.

6. In a cotton cleaner, an inclined series of gangs of saws, an inclined downwardly converging conveyer under the saws, and means to shift the lower end of the conveyer and thereby adjust the degree of convergence thereof.

7. In a cotton cleaner, a series of gangs of saws on parallel horizontal axes lying in an inclined plane, and an inclined downwardly converging conveyer extending under them, said conveyer comprising longitudinal bands with spaced transverse channels attached thereto.

8. In a cotton cleaner, a gang of saws, and a toothed beater roll adjacent to said saws, the teeth being adapted to extend between the saws and the sides of the teeth being spaced from the saws a distance greater than the normal thickness of a cotton seed.

9. In a cotton cleaner, a series of gangs of saws, a sharply inclined conveyer for the cotton adjacent to said saws, the conveyer approaching closer to the successive gangs of saws toward its delivery end, beaters adjacent to said saws, and brushes to coact with the saws on the opposite sides thereof from the conveyer.

10. In a cotton cleaner, a series of gangs of saws, a sharply inclined conveyer for the cotton adjacent to said saws, the conveyer approaching closer to the successive gangs of saws toward its delivery end, beater rolls lying between the gangs of saws and coöperating respectively therewith, and rotary brushes on the opposite sides of the saws from the conveyer, there being one brush for each pair of gangs of saws coacting therewith.

11. In a cotton cleaner, gangs of saws arranged with their axes in the same sharply inclined plane, a downwardly moving conveyer under the same, the lower end of this conveyer being closer to the saws than the upper end, feeding mechanism adjacent to the upper end of the conveyer, means to drive the saws and the conveyer and the feeding mechanism, and means to start or stop the feeding mechanism independently of the conveyer and saws.

12. In a cotton cleaner, a hopper having a substantially horizontal rectangular opening in the bottom, the walls adjacent to the two longer sides thereof converging downwardly thereto, a toothed feeding roll lying within the hopper above said opening, a toothed breaking roll lying directly below the said roll and below the said opening in the bottom of the hopper, the teeth of the two rolls projecting side by side when they meet, driving connections for the two rolls, whereby the lower toothed breaking roll rotates much faster than the upper toothed feeding roll, a coarse screen directly below the breaking roll, and an adjustable toothed segment adjacent to the breaking roll at one side thereof.

13. In a cotton cleaner, a series of gangs of saws, and a sharply inclined conveyer for the cotton adjacent to said saws, the conveyer approaching close to the successive gangs of saws toward its delivery end, one end of the conveyer being adjustable in position so as to vary the degree of convergence.

14. In a cotton cleaner, a series of gangs of saws having their axes horizontal and in the same sharply inclined plane, a conveyer extending under the same and converging toward the saws at the lower end, said conveyer being made of spaced slats so as to permit trash to fall through between them.

In testimony whereof, I have subscribed my name.

ANTON A. ZALONDEK.

Witnesses:
CARL A. RICHMOND,
HENRY A. PARKS.

Copies of this patent may be obtained for five cents each, by addressing the "Commissioner of Patents, Washington, D. C."